(12) United States Patent
Choe et al.

(10) Patent No.: US 10,657,384 B2
(45) Date of Patent: May 19, 2020

(54) METHOD AND SYSTEM FOR DETERMINING COMPLEX SITUATION ACCORDING TO TIME FLOW OF EVENTS OCCURRING IN EACH DEVICE

(71) Applicant: SK HOLDINGS CO., LTD., Seoul (KR)

(72) Inventors: Chul Won Choe, Seoul (KR); Woo Yeong Jang, Gwangmyeong-si (KR)

(73) Assignee: SK HOLDINGS CO., LTD., Seoul (KR)

( * ) Notice: Subject to any disclaimer, the term of this patent is extended or adjusted under 35 U.S.C. 154(b) by 154 days.

(21) Appl. No.: 15/550,596

(22) PCT Filed: Mar. 11, 2016

(86) PCT No.: PCT/KR2016/002429
§ 371 (c)(1),
(2) Date: Aug. 11, 2017

(87) PCT Pub. No.: WO2016/148445
PCT Pub. Date: Sep. 22, 2016

(65) Prior Publication Data
US 2018/0039839 A1    Feb. 8, 2018

(30) Foreign Application Priority Data
Mar. 16, 2015    (KR) .......................... 10-2015-0035890

(51) Int. Cl.
*G06K 9/00*    (2006.01)
*G08B 13/00*    (2006.01)
(Continued)

(52) U.S. Cl.
CPC ......... *G06K 9/00771* (2013.01); *G06N 5/025* (2013.01); *G06N 5/04* (2013.01);
(Continued)

(58) Field of Classification Search
CPC .... G06K 9/00771; G06T 7/246; G06N 5/025; G08B 13/00; G08B 25/00
See application file for complete search history.

(56) References Cited

U.S. PATENT DOCUMENTS

| | | | | |
|---|---|---|---|---|
| 2001/0033227 A1* | 10/2001 | Eskildsen | .............. | G08B 13/04 340/544 |
| 2008/0309449 A1* | 12/2008 | Martin | .................... | H04W 4/90 340/3.1 |

(Continued)

FOREIGN PATENT DOCUMENTS

| KR | 10-2010-0046526 A | 5/2010 |
|---|---|---|
| KR | 10-2012-0074718 A | 7/2012 |

(Continued)

OTHER PUBLICATIONS

Hagler, Stuart "Unobtrusive and Ubiquitous In-Home Monitoring: A Methodology for Continuous Assessment of Gait Velocity in Elders" IEEE Transactions on Biomedical Engineering. (Year: 2010).*

(Continued)

*Primary Examiner* — Kim Y Vu
*Assistant Examiner* — Molly Delaney
(74) *Attorney, Agent, or Firm* — Sughrue Mion, PLLC

(57) ABSTRACT

Provided is a method and system for determining a complex situation according to the time flow of events occurring in each device. In a method for determining a complex situation according to an embodiment of the present invention, a current situation is determined by detecting events occurring in devices and referring to a complex situation determination rule. The complex situation determination rule is a rule in which the current situation is mapped according to the (Continued)

<Occurrence Times of Events> events, which have occurred in the devices, and time intervals between the events. The present invention enables a more reliable determination of the current situation by complexly considering not only the events occurring in the devices but also time intervals between the events.

14 Claims, 5 Drawing Sheets

(51) Int. Cl.
*G08B 29/18* (2006.01)
*G06N 5/04* (2006.01)
*G08B 25/00* (2006.01)
*G06T 7/246* (2017.01)
*G06N 5/02* (2006.01)

(52) U.S. Cl.
CPC .............. *G06T 7/246* (2017.01); *G08B 13/00* (2013.01); *G08B 25/00* (2013.01); *G08B 29/188* (2013.01); *G06T 2207/20021* (2013.01); *G06T 2207/30196* (2013.01); *G06T 2210/12* (2013.01); *G06T 2210/21* (2013.01)

(56) References Cited

U.S. PATENT DOCUMENTS

| 2011/0066081 | A1* | 3/2011 | Goto | A61B 5/1118 600/595 |
| 2014/0005809 | A1* | 1/2014 | Frei | H04L 29/1249 700/90 |
| 2015/0156031 | A1* | 6/2015 | Fadell | H04L 12/2816 700/276 |
| 2015/0199810 | A1* | 7/2015 | Lee | G06K 9/00771 382/103 |
| 2016/0343243 | A1* | 11/2016 | Rabb | H04L 12/2829 |
| 2017/0278003 | A1* | 9/2017 | Liu | G06N 5/025 |
| 2017/0279836 | A1* | 9/2017 | Vasseur | H04L 63/1425 |

FOREIGN PATENT DOCUMENTS

| KR | 10-2014-0000874 A | 1/2014 |
| KR | 10-2014-0039930 A | 4/2014 |

OTHER PUBLICATIONS

Korean Office Action for KR 10-2015-0035890 dated Jul. 8, 2016.
International Search Report for PCT/KR2016/002429 dated Jun. 1, 2016.

* cited by examiner

<Occurrence Times of Events>

<Complex Situation Analytic Rule: Condition #1>

<Complex Situation Analytic Rule: Condition #2>

METHOD AND SYSTEM FOR DETERMINING COMPLEX SITUATION ACCORDING TO TIME FLOW OF EVENTS OCCURRING IN EACH DEVICE

TECHNICAL FIELD

The present invention relates to a method for determining a situation, and more particularly, to a method for determining a current situation on the basis of events occurring in various devices and a system applying the same.

BACKGROUND ART

Demand for unmanned security systems is increasing. This is because, if an alarm system is established by installing sensors in a surveillance region and is used, the number of managers necessary for security can be reduced and also the number of times managers encounter a dangerous situation can be minimized.

A related-art alarm system just monitors events occurring in sensors. That is, the related-art alarm system just monitors in which sensor an event (for example, an intrusion) has occurred. Accordingly, it is impossible to determine a more detailed current situation through the related-art alarm system.

In addition, monitoring by the related-art alarm system includes fragmentary operations. That is, when events occur in various sensors in sequence, the events are treated separately and collected information are fragmentarily used. Therefore, there is a problem that information may not be efficiently used.

DISCLOSURE

Technical Problem

The present invention has been developed in order to solve the above-mentioned problem, and an object of the present invention is to provide a method for determining a current situation by complexly considering not only events occurring in devices but also time intervals therebetween, and a system applying the same.

Technical Solution

According to one embodiment of the present invention to achieve the above-described object, a method for determining a complex situation includes the steps of: detecting events occurring in devices; and determining a current situation by referring to a result of the detecting in the step of detecting and a complex situation analytic rule, and the complex situation analytic rule is a rule which maps a current situation according to the events occurring in the devices and time intervals between the events.

In addition, the complex situation analytic rule may include a first condition and a first situation which is mapped onto the first condition, and the first condition may include a first detection condition in which a first event is detected in a first device, and a second detection condition in which a second event is detected in a second device before a first time elapses after the first event of the first device.

In addition, the first condition may further include a third detection condition in which a third event is detected in a third device before a second time elapses after the second event of the second device.

In addition, the first condition may further include a fourth detection condition in which a fourth event is detected in a fourth device before a third time elapses after the first event of the first device.

In addition, the fourth detection condition may be combined either by an AND condition or an OR condition with the second detection condition.

In addition, according to one embodiment of the present invention, the method may further include a step of withdrawing the determined current situation on the basis of time intervals between the events.

In addition, the step of withdrawing may include withdrawing the determined current situation when a time intervals between specific events is less than a threshold time.

In addition, according to one embodiment of the present invention, the method may further include a step of grasping a current situation progression direction using an order of the events detected in the step of detecting and locations of the devices where the events have occurred.

In addition, according to one embodiment of the present invention, the method may further include a step of calculating a current situation progression speed using time intervals defined in the complex situation analytic rule and time intervals of the events detected in the step of detecting.

In addition, the method may further include a step of calculating a current situation progression speed using distances between the devices and the time intervals of the events detected in the step of detecting.

According to another embodiment of the present invention, a server for determining a situation includes: a communication unit connected with devices to communicate therewith; and a processor configured to determine a current situation by referring to a result of detecting events occurring in the devices connected via the communication unit and a complex situation analytic rule, and the complex situation analytic rule is a rule which maps a current situation according to the events occurring in the devices and time intervals between the events.

Advantageous Effects

According to exemplary embodiments of the present invention as described above, a current situation can be more reliably determined by complexly considering not only events occurring in devices but also time intervals therebetween.

In addition, according to exemplary embodiments of the present invention, a current situation can be more exactly determined by providing not only a progression route of the current situation but also a progression speed.

Furthermore, according to exemplary embodiments of the present invention, the usefulness of a result of determination can be enhanced by adding a configuration for withdrawing an unreasonable determination of a current situation.

BEST MODE

Hereinafter, the present invention will be described in more detail with reference to the accompanying drawings.

1. Complex Situation Analytic Rule

In embodiments of the present invention, a current situation is determined by complexly considering events occurring in various devices. Specifically, a current situation is determined by considering not only the orders of events but also occurring times of the events, that is, on the basis of the time flow of the events.

Such a determination is performed with reference to a complex situation analytic rule which defines "detected events and time intervals therebetween" as a "condition" and maps a "current situation" onto a defined condition.

Hereinafter, the concept of the complex situation analytic rule will be described in detail with reference to FIGS. 1 to 4.

Figure 1:
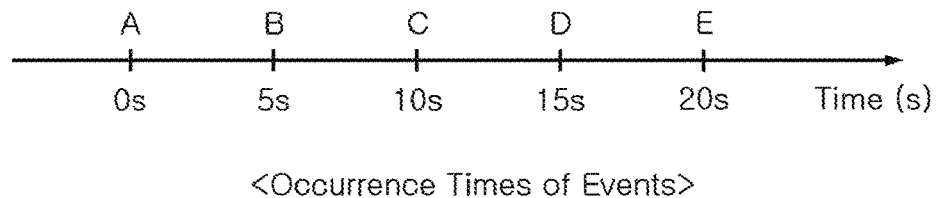
FIG. 1 is a flowchart showing times at which events occur in devices.
Figure 2:
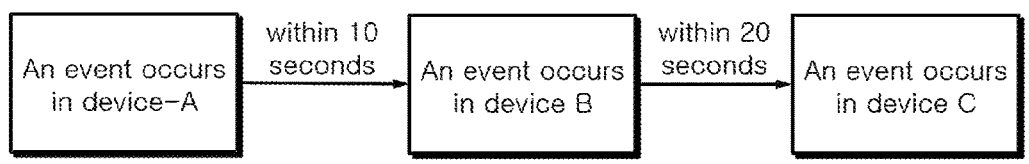
FIGS. 2 to 4 are views conceptually showing conditions of complex situation analytic rules.
Figure 3:
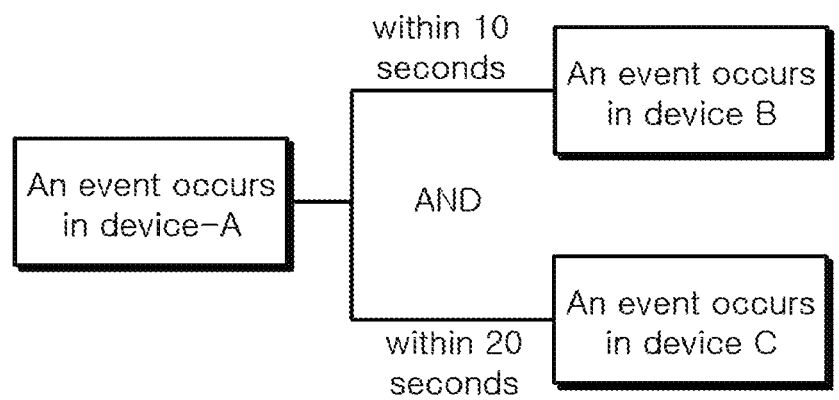
Figure 4:
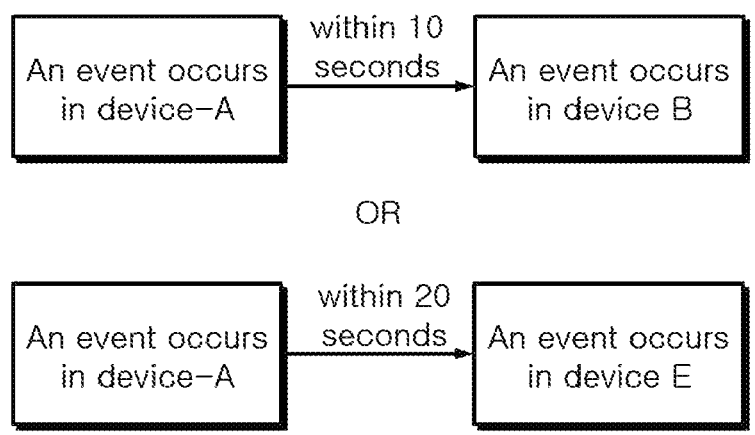

FIG. 1 is a flowchart showing times at which events occur in devices, and FIGS. 2 to 4 are views conceptually showing conditions of the complex situation analytic rule. FIG. 1 illustrates that:

1) an event has occurred in a "device-A" at "0" second;
2) an event has occurred in a "device-B" at "5" seconds;
3) an event has occurred in a "device-C" at "10" seconds;
4) an event has occurred in a "device-D" at "15" seconds; and
5) an event has occurred in a "device-E" at "20" seconds.

FIG. 2 illustrates one of the conditions defined in the complex situation analytic rule. Condition #1 shown in FIG. 2 indicates that:

11) an event occurs in the device-A;
12) an event occurs in the device-B within 10 seconds after the event of the device-A; and
13) an event occurs in the device-C within 20 seconds after the event of the device-B.

Although not shown, condition #1 is mapped onto a specific situation (for example, a situation in which "an intruder intruding into an F1 region moves to an F2 region") in the complex situation analytic rule. The time flow of the events shown in FIG. 1 satisfies condition #1 shown in FIG. 2.

Accordingly, when events occur as shown in FIG. 1 and follow condition #1 of the complex situation analytic rule, a current situation is determined to be that "an intruder currently intruding into the F1 region is moving to the F2 region."

FIG. 3 illustrates another condition defined in the complex situation analytic rule. Condition #2 shown in FIG. 3 indicates that:

21) an event occurs in the device-A;
22) an event occurs in the device-B within 10 seconds after the event of the device-A; and
23) an event occurs in the device-C within 20 seconds after the event of the device-A.

Although not shown, condition #2 is mapped onto a specific situation (for example, a situation in which "a fire occurring in the F1 region spreads to the F2 region") in the complex situation analytic rule. The time flow of the events shown in FIG. 1 satisfies condition #2 shown in FIG. 3.

Accordingly, when events occur as shown in FIG. 1 and follow condition #2 of the complex situation analytic rule, a current situation is determined to be that "a fire occurring in the F1 section is spreading to the F2 region."

FIG. 4 illustrates still another condition defined in the complex situation analytic rule. Condition #3 shown in FIG. 4 indicates that:

31) an event occurs in the device-A;
32) an event occurs in the device-B within 10 seconds after the event of the device-A; or
33) an event occurs in the device-E within 20 seconds after the event of the device-A.

Condition #3 defined in FIG. 4 and conditions #1 and #2 defined in FIGS. 2 and 3 have a common feature that the condition includes a plurality of detection conditions. Specifically, 1) condition #1 defined in FIG. 2 includes detection conditions "11," "12," and "13"
2) condition #2 defined in FIG. 3 includes detection conditions "21," "22," and "23," and
3) condition #3 defined in FIG. 4 includes detection conditions "31," "32," and "33."

However, conditions #1 and #2 defined in FIGS. 2 and 3 differ from condition #3 defined in FIG. 4 in that all detection conditions of conditions #1 and #2 include only AND conditions, whereas condition #3 complexly includes an AND condition and an OR condition.

Condition #3 is also mapped onto a specific situation (for example, a situation in which "a harmful substance leaking from the F1 region moves to the F2 region") in the complex situation analytic rule. The time flow of the events shown in FIG. 1 satisfies condition #3 shown in FIG. 4.

Accordingly, when events occur as shown in FIG. 1 and follow condition #3 of the complex situation analytic rule, a current situation is determined to be that "a harmful substance leaking from the F1 region is moving to the F2 region."

2. Complex Situation Determination System

Figure 5:
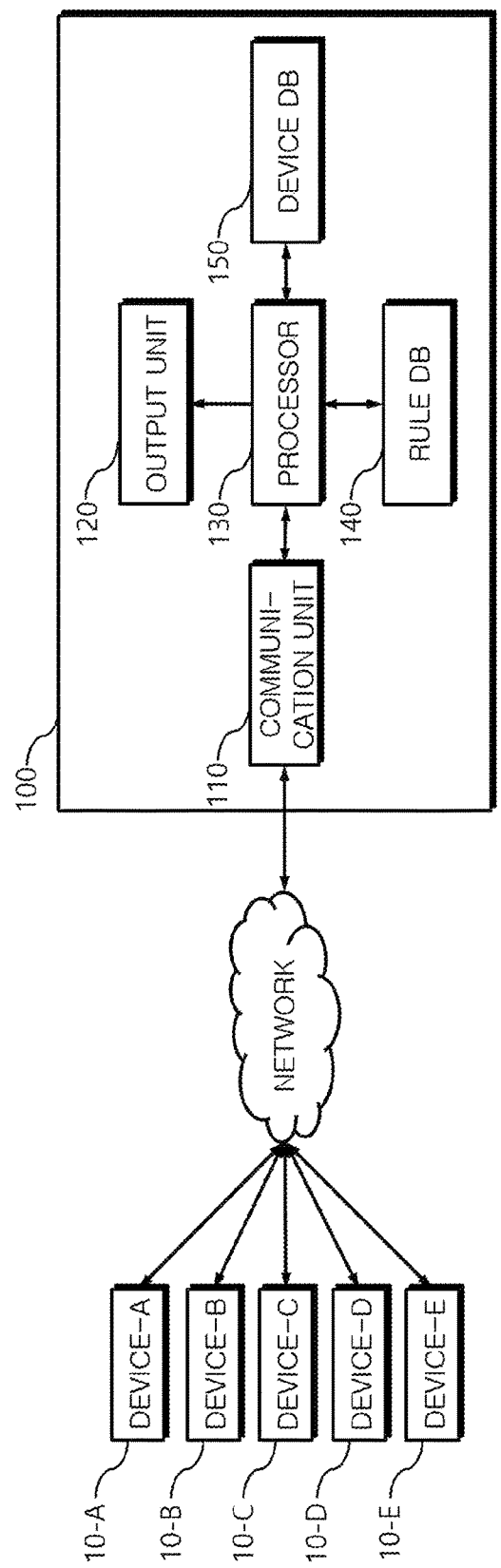
FIG. 5 is a view showing a complex situation determination system according to one embodiment of the present invention.

FIG. 5 is a view showing a complex situation determination system according to one embodiment of the present invention. As shown in FIG. 5, the complex situation determination system according to an embodiment of the present invention is established by connecting a plurality of devices 10-A, 10-B, 10-C, 10-D, and 10-E to a situation determination server 100 through a network to be able to communicate with the situation determination server 100.

The devices 10-A, 10-B, 10-C, 10-D, and 10-E are devices generating events and there is no limit to types of devices. The devices 10-A, 10-B, 10-C, 10-D, and 10-E may be established by various sensors (for example, a temperature sensor, a proximity sensor, a smoke sensor, a vibration sensor, or the like), a camera, a microphone, or the like.

In addition, the number of devices 10-A, 10-B, 10-C, 10-D, and 10-E in FIG. 5 is five. However, this is merely for convenience of illustration and there is no limit to the number of devices. In addition, there is no limit to the type of a network connecting the devices 10-A, 10-B, 10-C, 10-D, and 10-E and the situation determination server 100.

The situation determination server 100 monitor events occurring in the devices 10-A, 10-B, 10-C, 10-D, and 10-E, and determines a current situation by referring to the above-described complex situation analytic rule on the basis of the occurring events.

The situation determination server 100 performing the above-described functions includes a communication unit 110, an output unit 120, a processor 130, a rule DB 140, and a device DB 150 as shown in FIG. 5.

The communication unit 110 enables communication between the situation determination server 100 and the devices 10-A, 10-B, 10-C, 10-D, and 10-E by setting and maintaining a communication connection with the devices 10-A, 10-B, 10-C, 10-D, and 10-E through the network.

The output unit 120 includes a display for displaying a determined current situation and an outputting means such as a speaker, a light bar, or the like for outputting a necessary alarm according to the current situation.

The rule DB 140 is a DB in which the above-described complex situation analytic rules are established, and the device DB 150 is a DB in which detailed information of the devices 10-A, 10-B, 10-C, 10-D, and 10-E and events occurring in the devices 10-A, 10-B, 10-C, 10-D, and 10-E are accumulated.

The processor 130 determines a current situation by referring to the complex situation analytic rules established in the rule DB 140 on the basis of the events of the devices 10-A, 10-B, 10-C, 10-D, and 10-E which are collected through the communication unit 110, and notifies a manager of the determined current situation through the output unit 120.

3. Method for Determining Complex Situation

Figure 6:
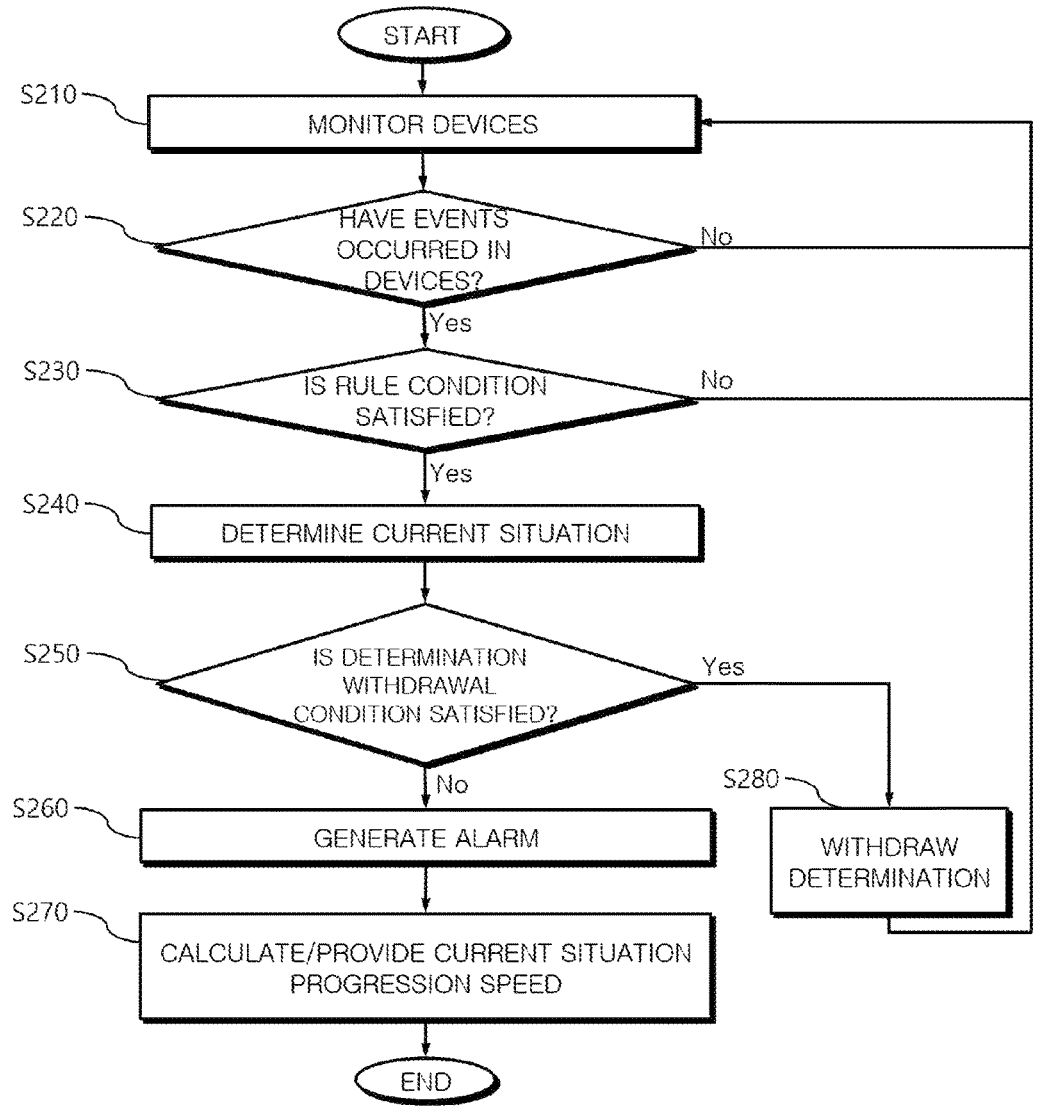
FIG. 6 is a flowchart provided to explain a method for determining a complex situation according to another embodiment of the present invention.

Hereinafter, a process of the processor 130 of the situation determination server 100 determining/notifying a current situation will be described in detail with reference to FIG. 6. FIG. 6 is a flowchart provided to explain a method for determining a complex situation according to another embodiment of the present invention.

As shown in FIG. 6, the processor 130 monitors the devices 10-A, 10-B, 10-C, 10-D, and 10-E connected through the network (S210). When events occur in the devices (S220-Y), the processor 130 may discover whether there is a rule satisfying a condition from among the complex situation analytic rules established in the rule DB 140 (S230).

When there is no rule satisfying the condition (S230-N), the processor 130 stores the occurring events in the device DB 150 and continues monitoring the devices as in step S210.

When there is a complex situation analytic rule satisfying the condition in step S230 (S230-Y), the processor 130 determines a situation defined in the corresponding rule as a current situation (S240).

Next, the processor 130 determines whether a determination withdrawal condition is satisfied or not (S250). The determination withdrawal condition refers to a condition in which the condition of the complex situation analytic rule is satisfied, but it is unreasonable to determine a situation defined in the rule of the corresponding condition as a current situation. Since this has not been described above, this will be described in detail below.

When 11) an event occurs in the device-A, 12) an event occurs in the device-B within 10 seconds after the event of the device-A, and 13) an event occurs in the device-C within 20 seconds after the event of the device-B, condition #1 shown in FIG. 2 is satisfied.

However, when 3 seconds elapse after the event of the device-B, an event may occur in the device-C. It is assumed that this detection condition never occurs in the situation mapped onto condition #1, that is, in the situation in which the "intruder" intruding into the F1 region is moving to the F2 region. That is, it is assumed that this detection condition corresponds to a case in which "an animal faster than humans" enters the F1 region and moves to the F2 region.

Accordingly, when an event occurs in the device-C within 3 seconds after the event of the device-B, that is, before 5 seconds elapse after the event of the device-B, it is determined that a withdrawal condition of the situation determined by condition #1 is satisfied (S250-Y), the determination in step S240 is withdrawn (S280).

On the other hand, when the determination withdrawal condition is not satisfied (S250-N), the processor 130 displays the current situation and generates an alarm through the output unit 120 (S260).

Furthermore, the processor 130 may calculate a current situation progression speed, and provide the current situation progression speed through the output unit 120 (S270). The current situation progression speed may be calculated by calculating a ratio between time intervals defined in the complex situation analytic rule and detected time intervals.

For example, when time intervals of total 30 seconds (10 seconds+20 seconds) from an initial event occurring time to a final event occurring time are defined as shown in condition #1 of FIG. 2, but really detected time intervals are 20 seconds, that is, are less than 70% of the defined time intervals (30 seconds*70%=21 seconds), information indicating that "the intruder is moving" at high speed may be provided.

Furthermore, it is possible to calculate the current situation progression speed more exactly in other methods. For example, the current situation progression speed may be calculated using distances between the devices which can be obtained based on the locations of the devices, and event occurring times. For example, when the distance between the device-A and the device-B is 100 m and the event of the device-B occurs after 20 seconds since the event of the device-A has occurred, the current situation progression speed is calculated as 18 km/h[=0.1 km (20/3600 h)]

4. Variation Example

Up to now, the method and the system for determining a complex situation according to the time flow of events in devices have been described with reference to preferred embodiments.

The current situation defined in the complex situation analytic rule includes a progression route of the current situation (for example, an intrusion route, a fire spreading route, a harmful substance moving route, or the like). However, the progression route may not be defined in the complex situation analytic rule and a progression direction of the current situation may be grasped by generating event occurrence traces based on the locations of the devices where the events have occurred.

Meanwhile, when the devices 10-A, 10-B, 10-C, 10-D, and 10-E are movable types, for example, when mobile devices carried by managers are utilized as devices, a progression route of a current situation may be determined based on current locations of the devices 10-A, 10-B, 10-C, 10-D, and 10-E.

In addition, when there are movable devices as described above, the complex situation analytic rule may be configured to define occurrence of an event at a specific location rather than defining occurrence of an event in each device.

Furthermore, the condition of the complex situation analytic rule may include a determination withdrawal condition. In the example of FIG. 6, detection condition "13)" of condition #1 is modified to a condition in which an event occurs in the device-C between 5 seconds and 20 seconds after the event of the device-B. However, if this makes the complex situation analytic rules more complicated and much time and load are required to determine a current situation, it may be appropriate to manage the withdrawal condition separately.

In the above-described embodiments, one type of event occurs in the devices. However, it should be noted that this is just for convenience of explanation. The present invention is not limited to a case in which one type of event occurs in one type of device and a plurality of events may occur in one type of device. These events may be used as different factors in the complex situation analytic rule.

Furthermore, the number of detection conditions constituting the rule condition is not limited to three and a combination relationship between the detection conditions may be different from the types defined in FIGS. 2 to 4.

The technical idea of the present invention can be applied to a computer-readable recording medium having a computer program recorded thereon, for performing the function of the apparatus and the method according to the present embodiments. In addition, the technical idea according to various exemplary embodiments of the present invention may be implemented in the form of a computer-readable code recorded in a computer-readable recording medium. The computer-readable recording medium may be implemented by using any data storage device which can be read by a computer and can store data. For example, the computer-readable recording medium may include a ROM, a RAM, a CD-ROM, a magnetic tape, a floppy disk, an optical disk, a hard disk drive, or the like. A computer-readable code or program which is stored in the computer-readable recording medium may be transmitted through a network connected between computers.

While exemplary embodiments have been particularly shown and described above, it will be understood by those of ordinary skill in the art that the present invention is not limited to the above-described exemplary embodiments, and various changes in form and details may be made therein without departing from the spirit and scope of the present invention as defined by the following claims. In addition, various changes should not be interpreted as being separated from the technical idea or scope of the present invention.

The invention claimed is:

1. A method for determining a complex situation, the method comprising the steps of:
    obtaining, by an apparatus, events occurring in a set of devices among a plurality of devices connected to the apparatus via a network, wherein the events occur at time intervals and are detected by the set of devices, the apparatus includes a database in which complex situation analytic rules are established, the complex situation analytic rules map a plurality of situations onto a plurality of conditions, and each of the plurality of conditions is defined by events occurring in devices of the plurality of devices and time intervals of the events occurring in the devices; and
    determining, by the apparatus, a current situation by referring to a result of obtaining the events occurring in the set of devices in the step of obtaining and a complex situation analytic rule of the complex situation analytic rules,
    wherein the complex situation analytic rule is a rule which maps the current situation onto a condition included in the plurality of conditions and defined by the events occurring in the set of devices and the time intervals between the events occurring in the set of devices,
    wherein the plurality of conditions comprise a first detection condition defined by events occurring in a first device, a second device and a third device among the set of devices and time intervals among the events occurring in the first device, the second device and the third device, and each of events of the second device and the third device occurs after an event of the first device occurs,
    wherein the current situation is determined based on the rule mapping the current situation onto the first detection condition,
    wherein the first device, the second device and the third device are separate devices, and each of the first device, the second device and third device is connected to the apparatus via the network, and
    wherein the method further comprises:
    determining, by the apparatus, whether a determination withdrawal condition for withdrawing the determined current situation is satisfied based on an event occurring in the third device and obtained by the apparatus from the third device via the network and one of a time interval between the event occurring in the first device and obtained by the apparatus from the first device via the network and the event occurring in the third device and obtained by the apparatus from the third device via the network and a time interval between an event occurring in the second device and obtained by the apparatus from the second device via the network and the event occurring in the third device and obtained by the apparatus from the third device via the network, and
    withdrawing, by the apparatus, the determined current situation according to a result of the determination that the determination withdrawal condition is satisfied.

2. The method of claim 1, wherein the plurality of conditions further comprise a second detection condition in which an event is detected in a fourth device among the set of devices before a time elapses after the event of the first device.

3. The method of claim 2, wherein the second detection condition is combined either by an AND condition or an OR condition with the first detection condition.

4. The method of claim 1, wherein the step of withdrawing comprises withdrawing the determined current situation when the time interval between the event occurring in the second device and the event occurring in the third device is less than a threshold time.

5. The method of claim 1, further comprising a step of grasping a current situation progression direction using an order of the events occurring in the set of devices and locations of the set of devices where the events have occurred.

6. The method of claim 1, further comprising a step of calculating a current situation progression speed using time intervals defined in the complex situation analytic rule and time intervals of the events occurring in the set of devices.

7. The method of claim 1, further comprising a step of calculating a current situation progression speed using distances between the set of devices and the time intervals of the events occurring in the set of devices.

8. A server for determining a situation, comprising:
    a communication unit connected with a plurality of devices via a network to communicate with the plurality of devices; and
    a processor configured to obtain events occurring in a set of devices among the plurality of devices and determine a current situation by referring to a result of obtaining the events and a complex situation analytic rule of complex situation analytic rules,
    wherein the events occur at time intervals and are detected by the set of devices, the server includes a database in which the complex situation analytic rules are established, the complex situation analytic rules map a plurality of situations onto a plurality of conditions, and each of the plurality of conditions is defined by events occurring in devices of the plurality of devices and time intervals of the events occurring in the devices, wherein the complex situation analytic rule is a rule which maps the current situation onto a condition included in the plurality of conditions and defined by the events occurring in the set of devices and the time intervals between the events occurring in the set of devices, wherein the plurality of conditions comprise a first detection condition defined by events occurring in a first device, a second device and a third device among the set of devices and time intervals among the events occurring in the first device, the second device and the third device, and each of events of the second device and the third device occurs after and event of the first device occurs, wherein the current situation is determined based on the rule mapping the current situation onto the first detection condition, wherein the first device, the second device and the third device are separate devices and, each of the first device, the second device and third device is connected to the server via the network, and wherein the processor is further configured to determine whether a determination withdrawal condition for withdrawing the determined current situation is satisfied based on an event occurring the third device and obtained by the server from the third device via the network and one of a time interval between the event occurring in the first device and obtained by the server from the first device via the network and the event occurring in the third device and obtained by the server from the third device via the network and a time interval between an event occurring in the second device and obtained by the server from the second device via the network and the event occurring in the third device and obtained by the server from the third device via the network and withdraw the determined current situation according to a result of the determination that the determination withdrawal condition is satisfied.

9. The server of claim 8, wherein the plurality of conditions further comprise a second detection condition in which a fourth event is detected in a fourth device among the set of devices before a elapses after the event of the first device.

10. The server of claim 9, wherein the second detection condition is combined either by an AND condition or an OR condition with the first detection condition.

11. The server of claim 8, wherein the processor is further configured to withdraw the determined current situation when the time interval between the event occurring in the second device and the event occurring in the third device is less than a threshold time.

12. The server of claim 8, wherein the processor is further configured to grasp a current situation progression direction using an order of the events occurring in the set of devices and locations of the set of devices where the events have occurred.

13. The server of claim 8, wherein the processor is further configured to calculate a current situation progression speed using time intervals defined in the complex situation analytic rule and time intervals of the events occurring in the set of devices.

14. The server of claim 8, wherein the processor is further configured to calculate a current situation progression speed using distances between the set of devices and the time intervals of the events occurring in the set of devices.

* * * * *